United States Patent
Song et al.

(10) Patent No.: US 11,170,515 B2
(45) Date of Patent: Nov. 9, 2021

(54) TEXTURE RECOGNITION METHOD AND APPARATUS, AND COMPUTER-READABLE STORAGE MEDIUM THEREOF

(71) Applicants: BOE Technology Group Co., Ltd., Beijing (CN); Hefei BOE Optoelectronics Technology Co., Ltd., Hefei (CN)

(72) Inventors: Jie Song, Beijing (CN); Honggang Gu, Beijing (CN); Miao Yuan, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 150 days.

(21) Appl. No.: 16/203,942

(22) Filed: Nov. 29, 2018

(65) Prior Publication Data

US 2019/0362509 A1 Nov. 28, 2019

(30) Foreign Application Priority Data

May 25, 2018 (CN) .......................... 201810515928.1

(51) Int. Cl.
*G06T 7/44* (2017.01)
*G06K 9/00* (2006.01)
*G06K 9/80* (2006.01)

(52) U.S. Cl.
CPC ............ *G06T 7/44* (2017.01); *G06K 9/00067* (2013.01); *G06K 9/00375* (2013.01); *G06K 9/80* (2013.01)

(58) Field of Classification Search
CPC ................ G06F 21/32; G06K 9/00013; G06K 9/00067; G06K 9/00087; G06K 9/00375;
(Continued)

(56) References Cited

U.S. PATENT DOCUMENTS 5,659,626 A * 8/1997 Ort ........................... G07C 9/37
382/125
7,072,523 B2 * 7/2006 Bolle .................. G06K 9/00067
382/124
(Continued)

FOREIGN PATENT DOCUMENTS

CN 1754503 A 4/2006
CN 101464945 A 6/2009
(Continued)

OTHER PUBLICATIONS

Kusanagi et al. "A practical person authentication system using second minor finger knuckles for door security" PSJ Transactions on Computer Vision and Applications, 2017, (Year: 2017).*
(Continued)

*Primary Examiner* — Mekonen T Bekele
(74) *Attorney, Agent, or Firm* — Fay Sharpe LLP (57) ABSTRACT

The present disclosure provides a texture recognition method and apparatus thereof. The texture recognition method includes: acquiring a side texture image of a selected joint of an creature to be recognized; extracting side texture features in the side texture image; and recognizing a side texture of the selected joint based on the extracted side texture features.

20 Claims, 9 Drawing Sheets

(58) Field of Classification Search
CPC .. G06K 9/4604; G06K 9/4642; G06K 9/6211; G06K 9/80; G06T 7/41; G06T 7/44
See application file for complete search history.

(56) References Cited

U.S. PATENT DOCUMENTS

| | | | |
|---|---|---|---|
| 8,929,617 B2* | 1/2015 | Vestgote | G06K 9/00073 382/124 |
| 2006/0072795 A1 | 4/2006 | Sano et al. | |
| 2008/0101662 A1* | 5/2008 | Lo | G06K 9/00087 382/124 |
| 2008/0101663 A1* | 5/2008 | Lo | G06K 9/0008 382/124 |
| 2009/0116706 A1 | 5/2009 | Hauke | |
| 2010/0067752 A1* | 3/2010 | Vestgote | G06Q 50/18 382/125 |
| 2010/0098299 A1* | 4/2010 | Muquit | G06K 9/00013 382/115 |
| 2010/0177937 A1* | 7/2010 | Zhang | G06K 9/00006 382/115 |
| 2010/0266169 A1* | 10/2010 | Abiko | G06K 9/00026 382/124 |
| 2011/0142353 A1* | 6/2011 | Hoshino | G06K 9/628 382/203 |
| 2011/0317886 A1* | 12/2011 | Matsuoka | G06K 9/00026 382/124 |
| 2018/0005014 A1 | 1/2018 | Chen et al. | |
| 2018/0089483 A1* | 3/2018 | Norimatsu | G06K 9/0008 |
| 2019/0236330 A1* | 8/2019 | Miyoshino | G07C 9/257 |
| 2019/0244006 A1* | 8/2019 | Miyoshino | G06K 9/0008 |

FOREIGN PATENT DOCUMENTS

| | | | |
|---|---|---|---|
| CN | 100590644 C | * | 2/2010 |
| CN | 101794374 A | | 8/2010 |
| CN | 104820828 A | | 8/2015 |
| CN | 105447436 A | | 3/2016 |

OTHER PUBLICATIONS

First office action of Chinese application No. 201810515928.1 dated Mar. 25, 2020.

* cited by examiner

TEXTURE RECOGNITION METHOD AND APPARATUS, AND COMPUTER-READABLE STORAGE MEDIUM THEREOF

This application claims priority to Chinese Patent Application No. 201810515928.1, filed on May 25, 2018 and titled "TEXTURE RECOGNITION METHOD AND APPARATUS THEREOF", the entire contents of which are incorporated herein by reference.

TECHNICAL FIELD

The present disclosure relates to a texture recognition method and apparatus and computer-readable storage medium thereof.

BACKGROUND

In recent years, with the constant development of global economy and information technology, information security issues are being more and more concerned, reliable identity authentication for users is needed in more and more fields.

SUMMARY

In an aspect, at least one embodiment of the present disclosure provides a texture recognition method, comprising:
acquiring a side texture image of a selected joint of a creature to be recognized;
extracting side texture features in the side texture image; and
recognizing a side texture of the selected joint based on the extracted side texture features.

In some embodiments, prior to extracting side texture features in the side texture image, the method further comprises: pre-processing the side texture image.

In some embodiments, the creature is a person, and the comprises a finger joint, and the side texture image comprises a side semi-annular ridge and a strip-like ridge of the selected joint.

In some embodiments, the recognizing a side texture of the selected joint based on the extracted side texture features comprises:
comparing the extracted side texture features with side texture features in a feature library, wherein the feature library stores side texture features of selected joints of at least one creature; and
determining that the extracted side texture features and the matched texture features are features of the same creature in response to presence of matched texture features in the feature library.

In some embodiments, prior to the recognizing a side texture of the selected joint based on the extracted side texture features, the method further comprises:
acquiring the side texture features of the selected joint of the creature for each organism of the at least one organism; and
storing the acquired side texture features of the selected joint of the at least one creature to the feature library.

In some embodiments, the acquiring a side texture image of a selected joint of a creature to be recognized comprises:
selecting a current security level from a plurality of security levels, the plurality of security levels corresponding to a plurality of acquisition counts, and the security levels being positively correlated with a value of the acquisition count; and acquiring p side texture images for the creature to be recognized, the p side texture images comprising at least one side texture image of the selected joint, and p being the acquisition count corresponding to the current security level, $p \geq 1$.

In some embodiments, the side texture features in the side texture image are fewer than texture features in a fingerprint image.

In some embodiments, the pre-processing comprises at least one of normalization processing, filter enhancement processing, binarization processing, and refinement processing.

In some embodiments, the extracting side texture features in the side texture image comprises:
determining a ridge termination point in the side texture image based on grayscale values of various pixels in the pre-processed side texture image;
determining a ridge bifurcation point in the side texture image based on the grayscale values of the various pixels in the pre-processed side texture image; and
determining a plurality of ridges in the side texture image based on the determined ridge termination point and the determined ridge bifurcation point, and extracting the plurality of ridges as the side texture features.

In some embodiments, the feature library stores a plurality of side texture features of the selected joint; and the comparing the extracted side texture features with side texture features in a feature library comprises:
comparing the extracted side texture features with the plurality of side texture features; or
comparing the extracted side texture features with at least one group of texture feature, wherein the at least one group of texture features are obtained by division of the plurality of side texture features, and each group of texture features comprise at least two side texture features, and comparison between the acquired texture features and the side texture features in each group of texture features is carried out simultaneously.

In another aspect, at least one embodiment of the present disclosure provides a texture recognition apparatus, comprising: an acquisition component and a processor,
wherein the acquisition component is configured to acquire a side texture image of a selected joint of a creature to be recognized;
the processor is configured to extract side texture features in the side texture image; and
the processor is further configured to recognize a side texture of the selected joint based on the extracted side texture features.

In some embodiments, the processor is further configured to pre-process the side texture image.

In some embodiments, the creature is a person, and the selected joint comprises a finger joint.

In some embodiments, the processor is configured to:
compare the extracted side texture features with side texture features in a feature library, wherein the feature library stores side texture features of selected joints of at least one creature; and
determine that the extracted side texture features and the matched texture features are features of the same creature in response to presence of matched texture features in the feature library.

In some embodiments, the texture recognition apparatus further comprises: a memory, wherein the acquisition component is further configured to, acquire the side texture features of the selected joint of the creature for each organism of the at least one organism; and the memory is configured to store the side texture features of the selected joint of the at least one creature acquired by the acquisition component to the feature library.

In some embodiments, the acquisition component is further configured to:

select a current security level from a plurality of security levels, the plurality of security levels corresponding to a plurality of acquisition counts, and the security levels being positively correlated with a value of the acquisition count; and acquire p side texture images for the creature to be recognized, the p side texture images comprising at least one side texture image of the selected joint, and p being the acquisition count corresponding to the current security level, $p \geq 1$.

In some embodiments, the side texture features in the side texture image are fewer than texture features in a fingerprint image.

In some embodiments, the processor is configured to perform at least one of the following pre-processing operations: normalization processing, filter enhancement processing, binarization processing, and refinement processing.

In some embodiments, the feature library stores a plurality of side texture features of the selected joints; and the processor is configured to:

compare the extracted side texture features with the plurality of side texture features; or compare the extracted side texture features with at least one group of texture feature, wherein the at least one group of texture features are obtained by division of the plurality of side texture features, and each group of texture features comprise at least two side texture features, and comparison between the acquired texture features and the side texture features in each group of texture features is carried out simultaneously.

In yet another aspect, at least one embodiment of the present disclosure provides a computer-readable storage medium having stored therein instructions, wherein the readable storage medium, when operates in a processor, causes the processor to perform one or more steps in the texture recognition method in the embodiments of the present disclosure.

It is to be understood that both the foregoing general description and the following detailed description are exemplary and explanatory only and are not restrictive of the present disclosure.

DETAILED DESCRIPTION

In order to make the principles of the present disclosure clearer, the present disclosure will be further described in detail below with reference to the accompanying drawings. Apparently, the described embodiments are only a part of the embodiments of the present disclosure, and not all of the embodiments. Based on the embodiments of the present disclosure, all the other embodiments obtained by a person of ordinary skill in the art without any creative effort shall fall within the protection scope of the present disclosure.

In the related art, identity authentication may be carried out by fingerprint recognition. However, the fingerprint is smooth and has a shallow texture and a weaker three-dimensional effect. As a result, the accuracy of extracting texture features is lower, and the accuracy of texture recognition is also lower.

An embodiment of the present disclosure provides a texture recognition method, which can extract texture features having a higher accuracy, and has a higher texture recognition accuracy.

Figure 1:
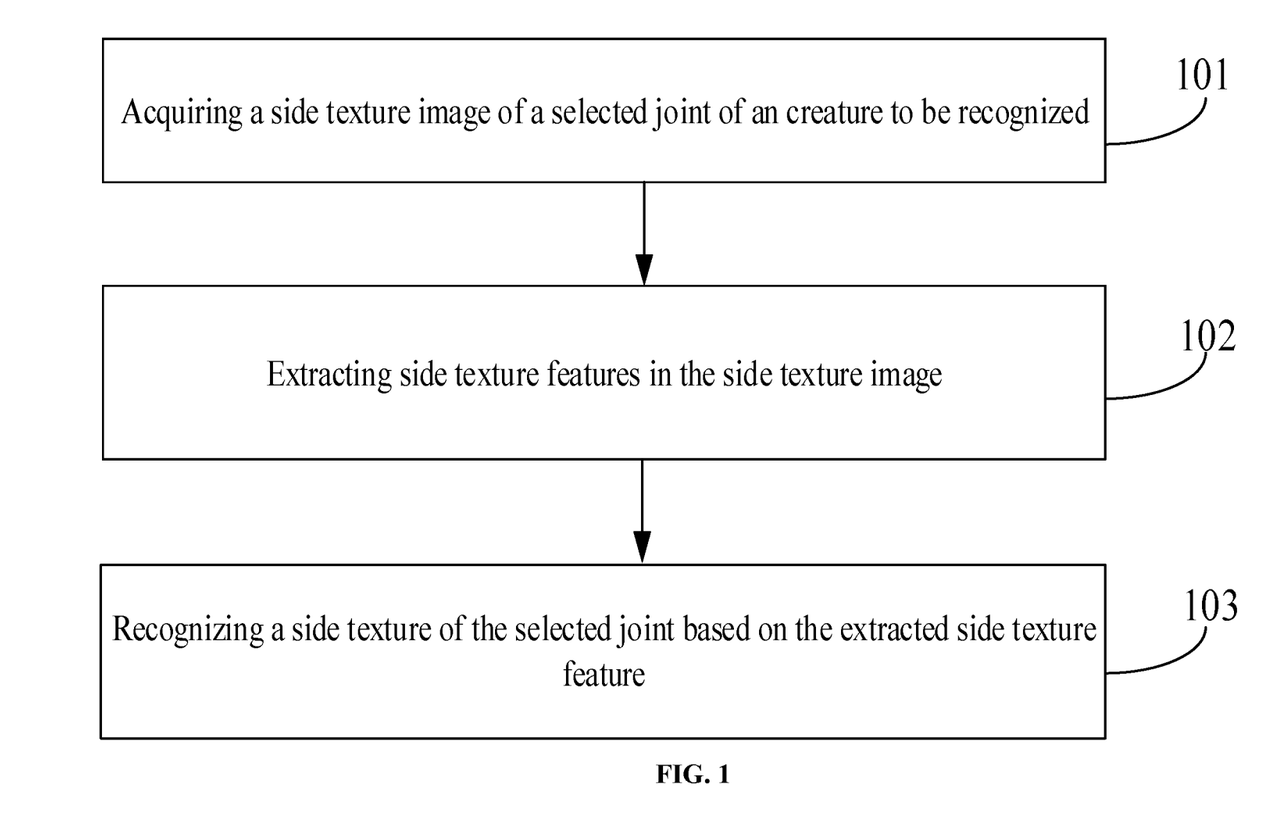
FIG. 1 is a flowchart of a texture recognition method according to an embodiment of the present disclosure.

FIG. 1 is a flowchart of a texture recognition method according to an embodiment of the present disclosure. The texture recognition method may be applied to a texture recognition apparatus. As illustrated in FIG. 1, the method may include the following steps:

In step 101, a side texture image of a selected joint of an creature to be recognized is acquired.

In step 102, side texture features in the side texture image are extracted.

In step 103, a side texture of the selected joint is recognized based on the extracted side texture feature.

In summary, in the texture recognition method according to this embodiment of the present disclosure, the side texture image of the selected joint of the creature is acquired, and side texture feature extraction and texture recognition are carried out based on the side texture image. Since the side texture of the joint has a strong concave and convex effect, and the texture is deep and achieves a strong three-dimensional effect, the accuracy of the extracted side texture features is higher, and the accuracy of texture recognition based on the side texture features is also higher.

Figure 2:
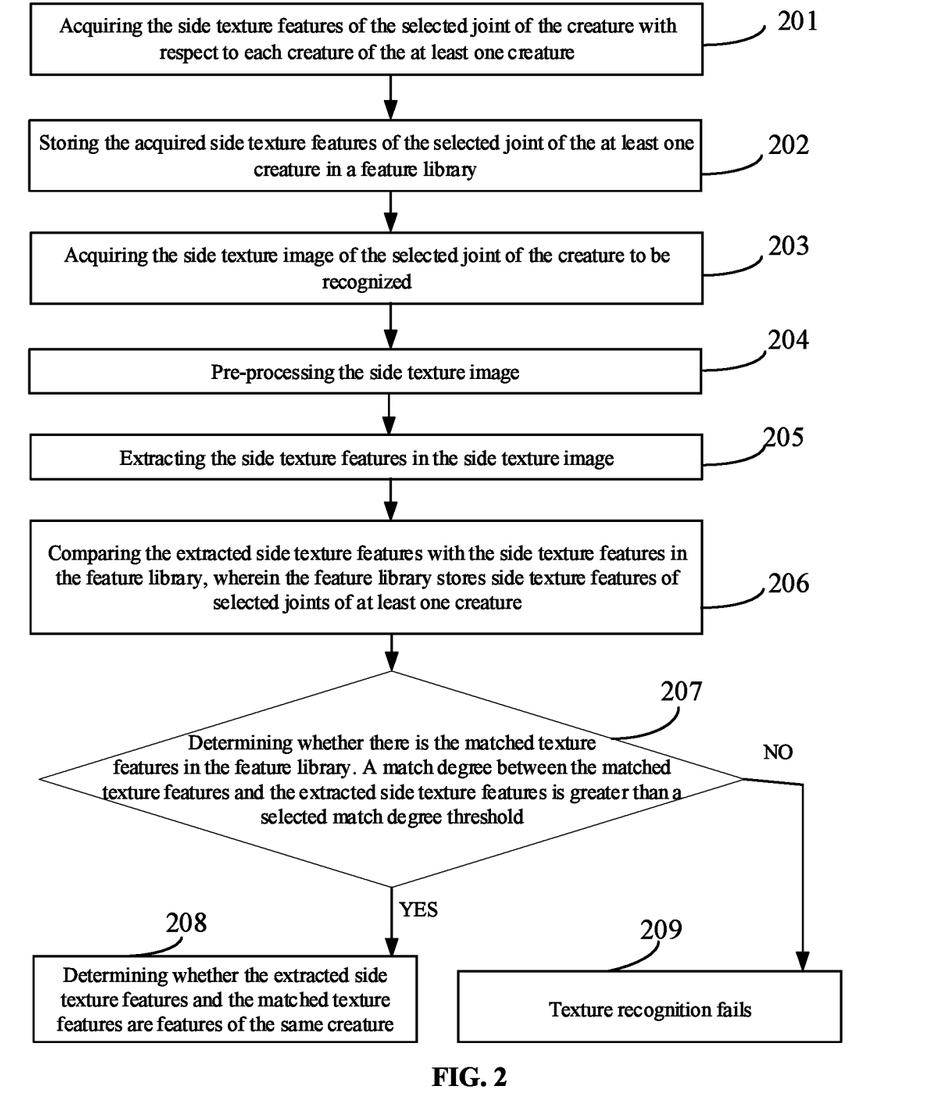
FIG. 2 is a flowchart of a texture recognition method according to an embodiment of the present disclosure.

FIG. 2 is a flowchart of a texture recognition method according to an embodiment of the present disclosure. The texture recognition method may be applied to a texture recognition apparatus. As illustrated in FIG. 2, the method may include the following steps:

In step 201, for each creature of the at least one creature, the side texture features of the selected joint of the creature is acquired. Step 202 is performed.

Optionally, the creature is a person, and the selected joint includes a finger joint.

Figure 3:
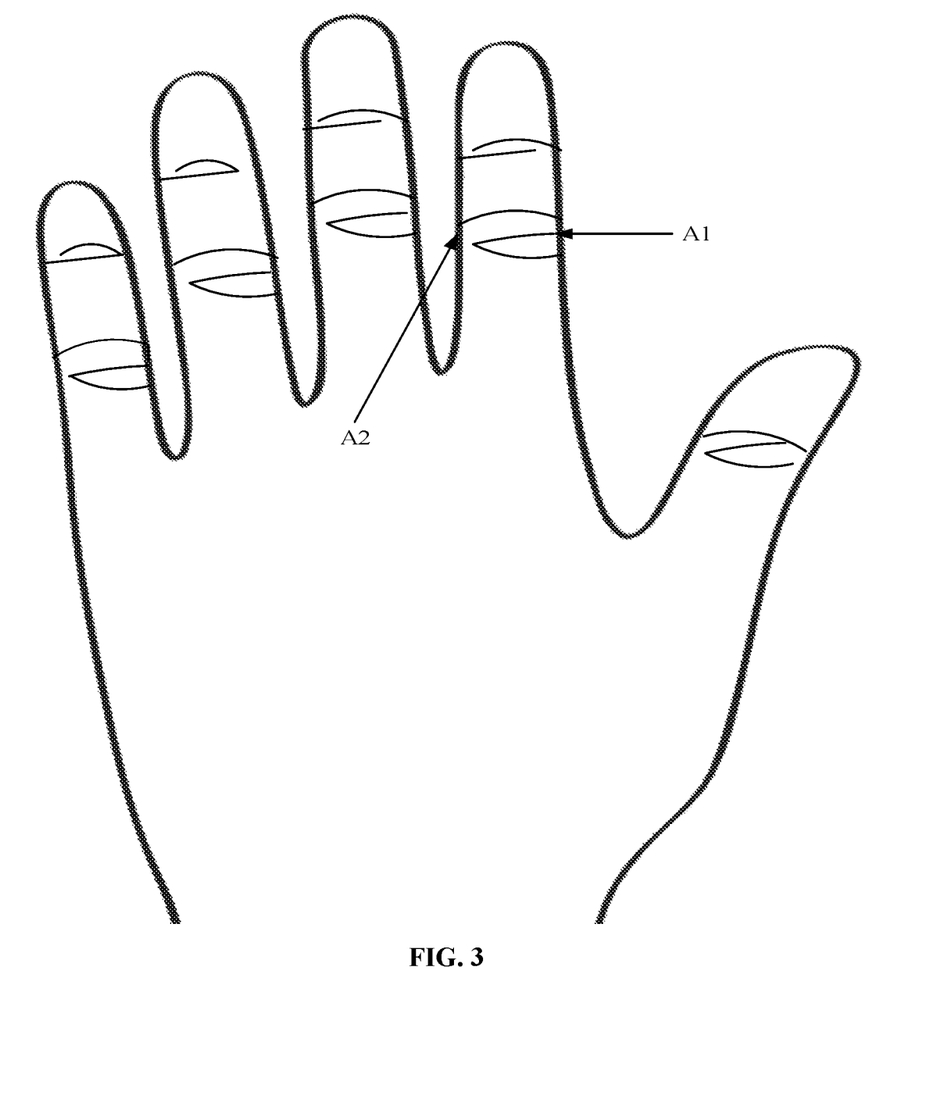
FIG. 3 is a schematic diagram of a finger joint according to an embodiment of the present disclosure.

Exemplarily, as illustrated in FIG. 3, one hand of a person includes five fingers, wherein the thumb includes one finger joint, and other fingers each include two finger joints.

In the present disclosure, the selected joint may be any finger joint of both hands or both feet of a person.

Still referring to FIG. 3, a palm has opposite back and palm surfaces (FIG. 3 illustrates the palm surface of the palm), and side faces of fingers are connected to the back surface and the palm surface. Each finger joint has two side faces. For example, the side faces of a finger joint of the index finger are a side face A1 and a side face A2 respectively. The thumb has totally two side textures of the finger joint (including two side textures of a finger joint), and the other fingers all have four side textures (including two side textures of each finger joint of two finger joints).

Figure 4:
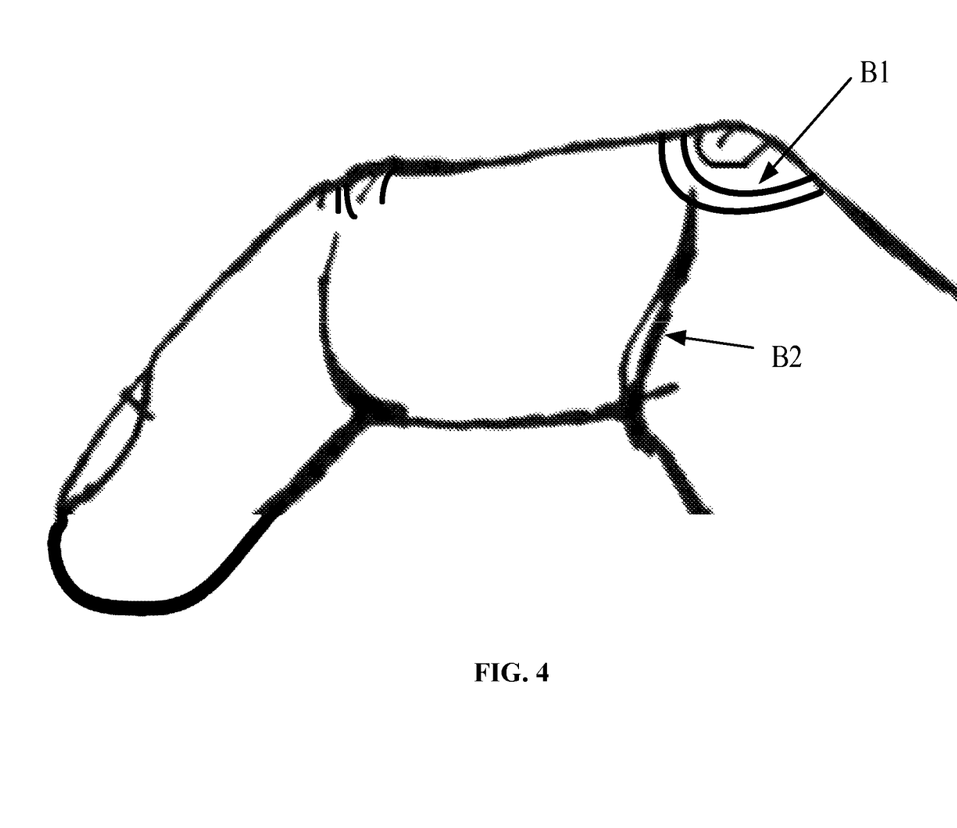
FIG. 4 is a schematic diagram of a finger joint according to an embodiment of the present disclosure.

Exemplarily, side textures of a joint may be as illustrated in FIG. 4. In FIG. 4, a side texture of each joint of the two joints is illustrated. Each side texture of each joint may include a semi-annular ridge B1 and a strip-like ridge B2.

It should be noted that the finger joints of each creature have one or more selected joints. That is, for each creature, the texture recognition apparatus may acquire side texture features of one or more selected joints of the creature. In the embodiments of the present disclosure, description is given by using the scenario where all the finger joints of one hand of a human body are the selected joints as an example. When acquiring the side texture features of each of the selected joints, the texture recognition apparatus may firstly acquire a side texture image of the selected joint, and then process the side texture image to obtain the side texture features.

In step 202, the acquired side texture features of the selected joint of the at least one creature are stored in a feature library.

After acquiring one side texture feature of each creature, the texture recognition apparatus may store the acquired side texture feature of the creature to the feature library for use in the future for texture recognition. It should be noted that the feature library not only stores a plurality of side texture features, but also marks an creature identity corresponding to each side texture feature.

In step 203, the side texture image of the selected joint of the creature to be recognized is acquired.

Optionally, before the side texture image of the selected joint of the creature to be recognized is acquired, the texture recognition apparatus may be configured to acquire or acquire from an external device a security level set constituted by a plurality of security levels. It should be noted that the number of security levels in the security level set correspond to the number of the acquisition count, and the value of the security level is positively correlated to the number of the acquisition count.

Exemplarily, a corresponding relationship between the security levels and the acquisition counts is as listed in Table 1. Security level 1 corresponding to acquisition count 3, security level 2 corresponds to acquisition count 2, and security level 3 corresponds to acquisition count 1. It is apparent that the higher the security level, the greater the acquisition count corresponding to the security level.

TABLE 1

| Security level | Acquisition count |
|---|---|
| 1 | 3 |
| 2 | 2 |
| 3 | 1 |

Optionally, in the embodiment of the present disclosure, only the scenario where the corresponding relationship between the security levels and the acquisition counts is the corresponding relationship listed in Table 1 is taken as an example. The corresponding relationship may also be different from that listed in Table 1. For example, security level 1 may also correspond to acquisition count 4 or the like, which is not limited in the embodiment of the present disclosure.

After a plurality of predetermined security levels are acquired, the fingerprint recognition apparatus may select a current security level from the plurality of security levels. Exemplarily, the fingerprint recognition apparatus may select the current security level from the plurality of security levels based on a selecting instruction triggered by a user. Alternatively, the fingerprint recognition apparatus may select a highest security level among the plurality of security levels as the current security level.

For example, before acquiring the side texture image of the creature to be recognized, the texture recognition apparatus may acquire an acquisition count p corresponding to the current security level, and acquire p side texture images (side texture images of the selected joints), $p \geq 1$. Exemplarily, as listed in Table 1, when the texture recognition apparatus determines that the current security level is security level 1, the texture recognition apparatus may also acquire three side texture images.

It should be noted that, in step 203, the side texture images acquired by the texture recognition apparatus may include the side texture image of at least one selected joint. For example, the p side texture images may be the side texture images of a selected joint, or the p side texture images may be formed by the side texture images of a plurality of selected joints.

In some embodiments, a step of pre-processing the side texture image in step 204 is further included.

Figure 5:
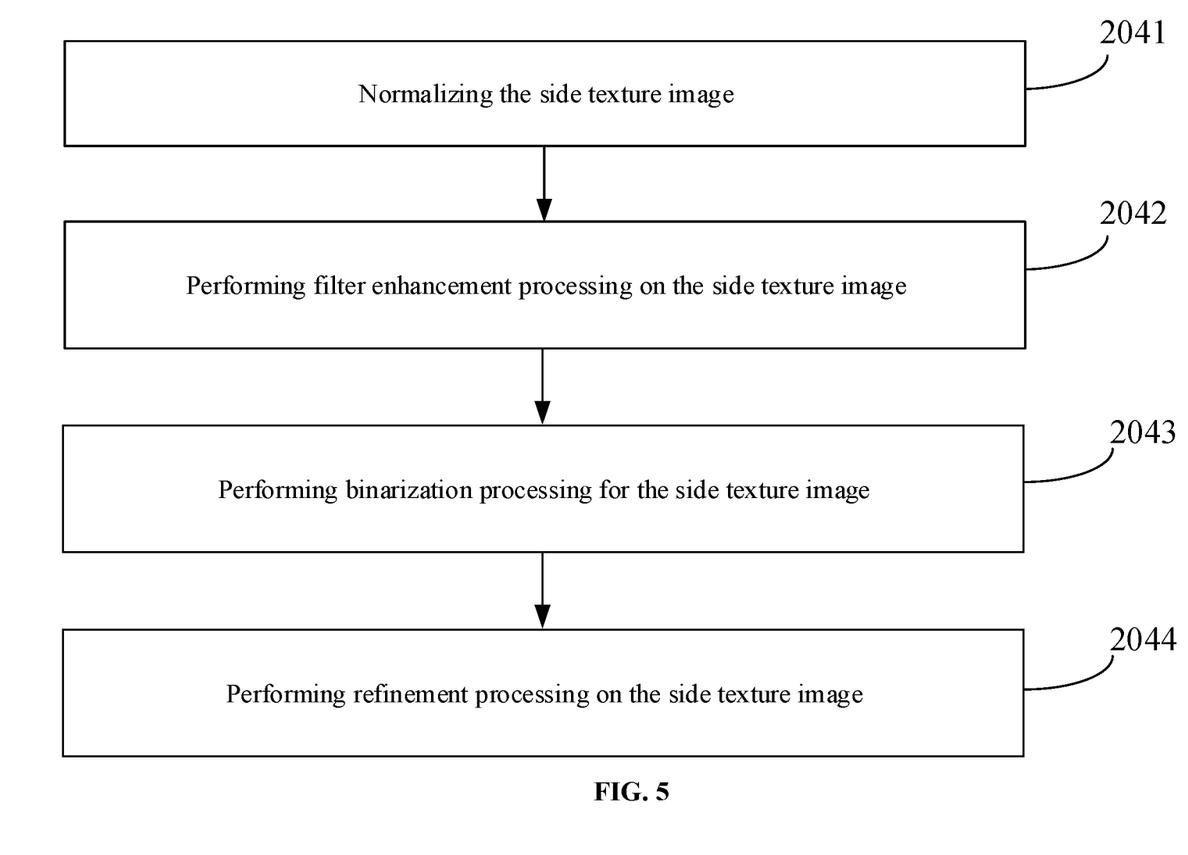
FIG. 5 is a flowchart of pre-processing a side texture image according to an embodiment of the present disclosure.

After acquiring the side texture images, the texture recognition apparatus may pre-process each of the acquired side texture images. It should be noted that the pre-processing may be carried out in multiple ways. In the embodiments of the present disclosure, the description is given by using the pre-processing way as illustrated in FIG. 5 as an example. As illustrated in FIG. 5, pre-processing the side texture image may include at least one of the following operations:

For example, in step 2041, the side texture image is normalized.

It should be noted that normalizing the side texture image by the texture recognition apparatus refers to: adjusting the grayscale of the side texture image to be within a predetermined grayscale range (that is, adjusting the grayscale of each pixel point in the side texture image to be within a predetermined grayscale range), and adjusting the contrast of the side texture image to be within a predetermined contrast range.

Optionally, when normalizing the side texture image, the texture recognition apparatus may selectively perform block-wise normalization processing for the side texture image, or may selectively perform overall normalization processing for the side texture image. Exemplarily, in the embodiments of the present disclosure, description is given by using the scenario where the texture recognition apparatus performs the overall normalization processing for the side texture image as an example.

When performing the overall normalization processing for the side texture image, the texture recognition apparatus may calculate a grayscale mean value M of the side texture image based on a grayscale averaging formula, and calculate a variance $\delta^2$ of the side texture image based on a variance formula:

The grayscale averaging formula is $$M = \frac{1}{m*n}\sum_{i=0}^{m}\sum_{j=o}^{n} G(i, j);$$

the variance formula is $$\delta^2 = \frac{1}{m*n}\sum_{i=0}^{m}\sum_{j=0}^{n} ((G(i, j) - M)^2);$$

and the side texture image includes m rows and n columns of pixel points, i represents a coordinate of a pixel point in the side texture image in a row arrangement direction of the pixel point, and j represents a coordinate of a pixel point in the side texture image in a column arrangement direction of the pixel point.

After obtaining the grayscale mean value M and the variance $\delta^2$ of the side texture image, the texture recognition apparatus may calculate a normalized value of each pixel point in the side texture image based on the grayscale mean value M and the variance $\delta^2$. Exemplarily, a normalized value G'(i, j) of each pixel point (I, j) may be calculated based on a normalization formula. The normalization formula is as follows:

$$G'(i, j) = \begin{cases} M_0 + \sqrt{\frac{\delta_0^2(G(i, j) - M)^2}{\delta^2}}, & G(i, j) \geq M \\ M_0 - \sqrt{\frac{\delta_0^2(G(i, j) - M)^2}{\delta^2}}, & G(i, j) \leq M \end{cases}$$

where G represents a Gabor function, $M_0$ represents a predetermined fixed grayscale mean value, and $\delta^2$ represents a predetermined fixed variance.

After obtaining the normalized value of each pixel point in the side texture image, the texture recognition apparatus may obtain the normalized side texture image based on the normalized value of each pixel point. In addition, a pixel value of each pixel point in the normalized side texture image is the normalized value of the pixel point.

For example, in step 2042, filter enhancement processing is performed on the side texture image.

In the process of acquiring the side texture images by the texture recognition apparatus, since the acquired side texture image may be greatly affected by external factors, such as the side textures of the finger joint may be stained with dust or liquid, the acquired side texture image is more noisy. At this time, the texture recognition apparatus needs to perform filtering enhancement processing for the normalized side texture image, to filter out the excessive noise in the image and to improve the resolution of the side texture image. This provides guarantee for extraction of the side texture features in the future.

There are various methods for performing the filtering enhancement processing on the normalized side texture image. Exemplarily, in the embodiments of the present disclosure, the filtering enhancement processing may be performed on the side texture image by using a predetermined function (for example, the Gabor function). When performing the filtering enhancement processing on the side texture image by using the predetermined function, the texture recognition apparatus may use the trend and the frequency of the textures in the normalized side texture image as parameters of the predetermined function, wherein the frequency of the textures is correlated to the size of spacing and the degree of density of the textures. Afterwards, the texture recognition apparatus may perform convolution for the predetermined function and the side texture image, to achieve the objective of performing the filtering enhancement processing for the normalized side texture image.

It should be noted that after the texture recognition apparatus performs the filtering enhancement processing on the side texture image, the excessive noise in the normalized side texture image can be effective eliminated, and the inherent features of the textures in the side texture image are highlighted. The inherent features of the textures may include a ridge termination point (a first pixel point in FIG. 6) and a ridge bifurcation point (a second pixel point in FIG. 7).

For example, in step 2043, binarization processing is performed for the side texture image.

Performing the binarization processing, by the texture recognition apparatus, for the side texture image experiencing the filter enhancement processing may include: setting grayscale values of pixel points in the side texture images to 0 or 255 by the texture recognition apparatus, such that the side texture image is turned into a visual effect of only presenting distinct black and white. The binarization processing may include: global binarization processing and partial binarization processing. In the embodiments of the present disclosure, the partial binarization processing is taken as an example.

Exemplarily, when performing the binarization processing for the side texture image by using the partial binarization processing, the texture recognition apparatus may divide the side texture image into a*a image blocks, where a is greater than or equal to 2. Afterwards, the texture recognition apparatus performs the binarization processing for each image block.

When performing the binarization processing for each image block, the texture recognition apparatus may firstly calculate a grayscale mean value of all the pixel points in the image block. Afterwards, the texture recognition apparatus may compare the grayscale value of each pixel point in the image block with the grayscale mean value. When the grayscale value of a pixel point is greater than the grayscale mean value, the texture recognition apparatus may set the grayscale value of this pixel point to 255; and when the grayscale value of a pixel point is less than or equal to the grayscale mean value, the texture recognition apparatus may set the grayscale of this pixel point to 0. In this way, the texture recognition apparatus sets the grayscale values of each of the pixel points in the image block to 0 or 255.

After the grayscale values in all the image blocks are set to 0 or 255, the binarized side texture image is obtained.

For example, in step 2044, refinement processing is performed on the side texture image.

Performing the refinement processing on the binarized side texture image by the texture recognition apparatus refers to: deleting a part of the pixel points at the edge among the pixel points where the ridges are located, such that the width of the ridge after deleting the part of pixel points is one pixel point.

The texture recognition apparatus performs the normalization processing, the filtering enhancement processing, the binarization processing and the refinement processing on the side texture image, so that the side texture features in the pre-processed side texture image can be more easily extracted, which reduces the complexity of extracting the side texture features.

In step 205, the side texture features in the side texture image are extracted.

Optionally, after the texture recognition apparatus pre-processes the side texture image, the pre-processed side texture image is a grayscale image. The texture recognition apparatus may extract the side texture features in the side texture image by using an algorithm based on the grayscale image.

Exemplarily, the side texture features in the side texture image may include a ridge in the side texture image, and the ridge is correlated with the ridge termination point and the ridge bifurcation point. The texture recognition apparatus may determine a plurality of ridges in the side texture image based on the ridge termination point and the ridge bifurcation point, and extract the plurality of ridges.

Optionally, there are various ways for the texture recognition apparatus to determine the ridge termination point and the ridge bifurcation point. Exemplarily, when determining the ridge termination point, the texture recognition apparatus may determine the ridge termination point in the side texture image by using a first algorithm; and when determining the ridge bifurcation point, the texture recognition apparatus may determine the ridge bifurcation point in the side texture image by using a second algorithm.

It should be noted that the first algorithm may be any one of an 8-neighborhood algorithm, a principal component analysis (PCA) algorithm and a multidimensional scaling (MDS) algorithm; and the second algorithm may also be any one of the 8-neighborhood algorithm, the PCA algorithm and the MDS algorithm. The first algorithm may be the same as the second algorithm or different from the second algorithm, which is not limited in the embodiment of the present disclosure.

Figure 6:
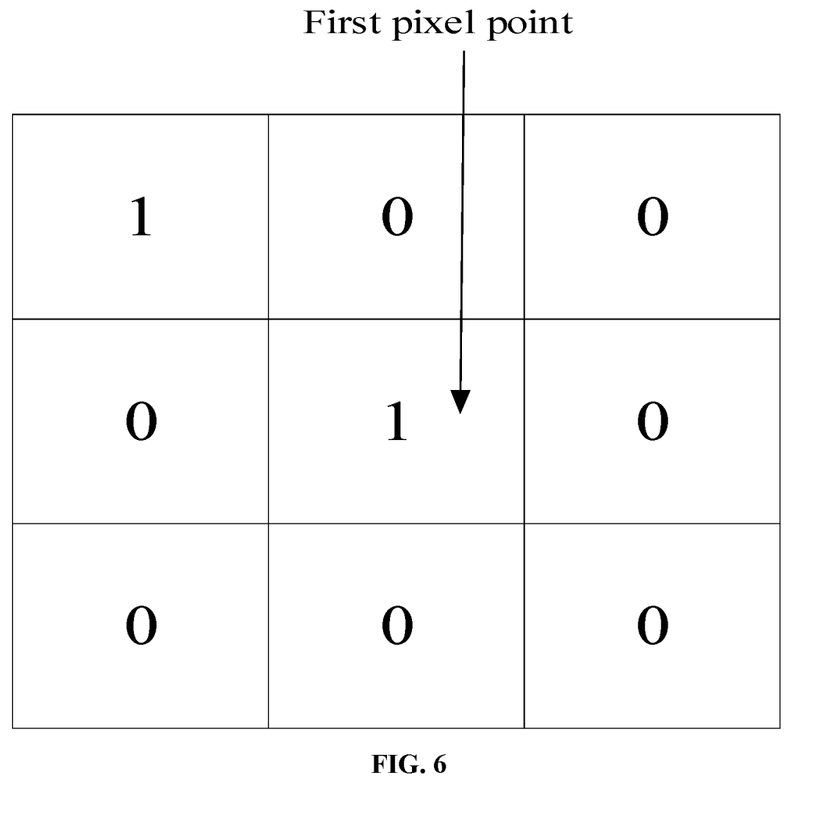
FIG. 6 is a schematic diagram of a process of processing a side texture image according to an embodiment of the present disclosure.

Exemplarily, in the present disclosure, description is given by using the scenario where the first algorithm and the second algorithm are both the 8-neighborhood algorithm as an example. As illustrated in FIG. 5 and FIG. 6, when searching for the ridge termination point and the ridge bifurcation point in the side texture image, it may be sequentially determined whether each pixel point is the ridge termination point or the ridge bifurcation point.

Herein, the texture recognition apparatus may acquire a plurality of grayscale equivalent values corresponding to the pixel points when determining each pixel point, and the plurality of grayscale equivalent values include: a grayscale equivalent value of this pixel point, and the grayscale equivalent values of adjacent pixel points of this pixel point. It should be noted that when the grayscale of a pixel point is 0, a grayscale equivalent value of this pixel point is 0; and when the grayscale of a pixel point is 255, a grayscale equivalent value of this pixel point is 1. Generally, a pixel point located within the image has eight adjacent pixel points, and a pixel point located at the edge of the image has less than eight adjacent pixel points.

After acquiring the grayscale value corresponding to each pixel point, the texture recognition apparatus may determine whether the grayscale equivalent value corresponding to this pixel point satisfies a ridge termination point condition and a ridge bifurcation point condition. When the grayscale equivalent value corresponding to a pixel point satisfies the ridge termination point condition, the texture recognition apparatus may determine the pixel point as the ridge termination point; and when the grayscale equivalent value corresponding to a pixel point satisfies the ridge bifurcation point condition, the texture recognition apparatus may determine the pixel point as the ridge bifurcation point.

Herein, the ridge termination point condition includes: a sum of the grayscale equivalent values corresponding to the pixel point is less than or equal to 2. The ridge bifurcation point condition includes:

$$\frac{1}{2}\sum_{i=1}^{k} |p_{i+1} - p_i| = 3.$$

It should be noted that the adjacent pixel points of each pixel point may be numbered, where $p_i$ represents an $i^{th}$ adjacent pixel point, $p_{i+1}$ represents an $i+1^{th}$ adjacent pixel point, $i \geq 1$ and i being less than or equal to k, k being the total number of adjacent pixels of the pixel point, $1 \leq k \leq 8$.

For example, FIG. 6 illustrates a first pixel point and eight adjacent pixel points thereof, wherein the grayscale equivalent value of the first pixel point is 1, and among the eight adjacent pixel points, the grayscale equivalent value of one adjacent pixel point is 1, and the grayscale equivalent values of the other adjacent pixel points are 0. The sum of the grayscale equivalent values corresponding to the first pixel point is 1. That is, the sum of the grayscale equivalent values corresponding to the first pixel point is less than or equal to 2. Therefore, it may be determined that the first pixel point satisfies the ridge termination point condition, and in this case, the texture recognition apparatus may determine the first pixel point as the ridge termination point.

Figure 7:
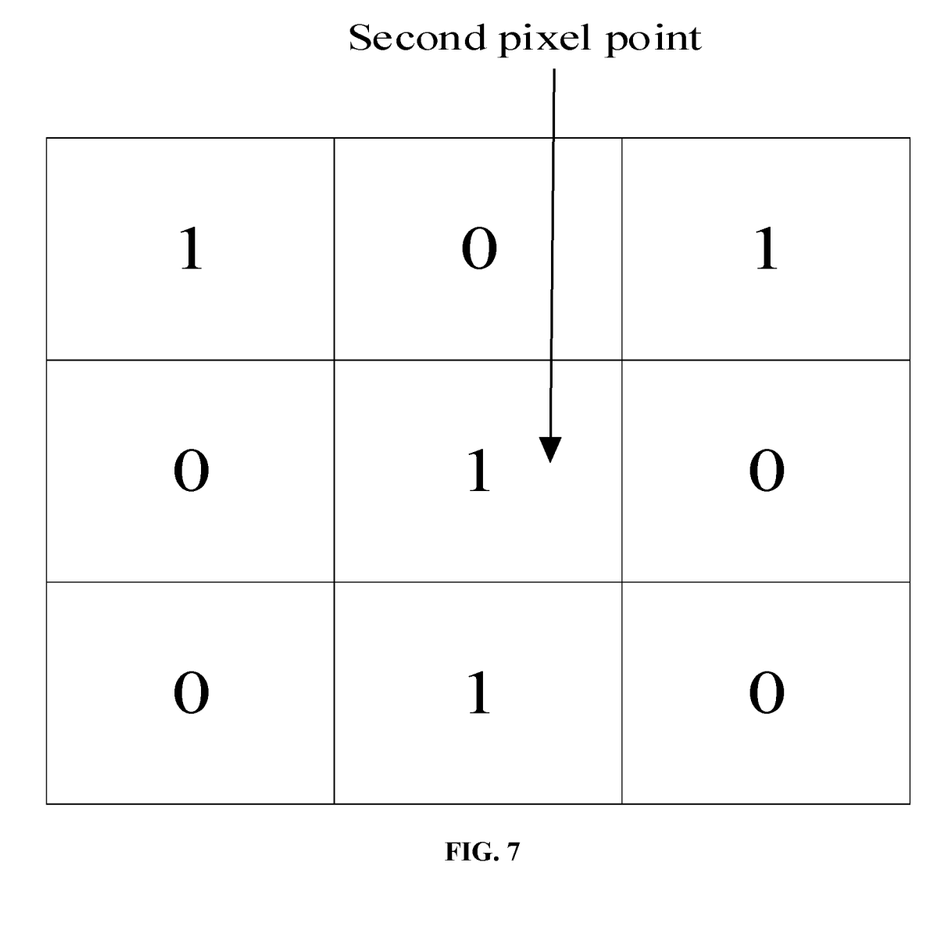
FIG. 7 is a schematic diagram of a process of processing a side texture image according to an embodiment of the present disclosure.

FIG. 7 illustrates a second pixel point and eight adjacent pixel points thereof, wherein the grayscale equivalent value of the first pixel point is 1, and among the eight adjacent pixel points, the grayscale equivalent value of one adjacent pixel point is 1, and the grayscale equivalent values of the other adjacent pixel points are 0. The grayscale equivalent values corresponding to the second pixel point satisfy formula $$\frac{1}{2}\sum_{i=1}^{k} |p_{i+1} - p_i| = 3.$$

Therefore, the texture recognition apparatus may determine the second pixel point as the ridge bifurcation point.

It should be noted that the side texture features of the finger joints are generally fewer than the texture features in a fingerprint image. Therefore, the texture recognition apparatus takes less time to extract the side texture features from the side texture image. In this way, the time for extracting the side texture features can be shortened very well.

In addition, the process of processing the acquired side texture image to obtain the side texture features in step 201 may be referenced to the processes in step 204 and step 205, which is not described in the embodiment of the present disclosure any further.

In step 206, the extracted side texture features are compared with the side texture features in the feature library.

After extracting the side texture features, the texture recognition apparatus may compare the side texture features with the side texture features in the feature library obtained in step 202, to determine whether the feature library includes matched texture features of the extracted side texture features. A match degree between the matched texture features and the extracted side texture features is greater than a selected match degree threshold.

Optionally, the texture recognition apparatus may compare the extracted side texture features with the side texture features in the feature library in multiple ways. Exemplarily, in the present disclosure, description is given by using two ways thereof as examples.

In some embodiments, the texture recognition apparatus may sequentially compare the acquired side texture features with a plurality of side texture features in the feature library.

In some embodiments, the texture recognition apparatus may divide the plurality of side texture features in the feature library into at least one group of texture features. Each group of texture features includes at least two side texture features. When comparing the extracted side texture features with the selected side texture features in the feature library, the texture recognition apparatus may sequentially compare the extracted side texture features with at least one group of texture features, and the extracted texture features are simultaneously compared with the at least two side texture features in each group of texture features.

In step 207, it is determined whether there is the matched texture features in the feature library. If there is the matched texture features in the feature library, step 208 is performed; and if there is no the matched texture features in the feature library, step 209 is performed.

In step 208, it is determined whether the extracted side texture features and the matched texture features are features of the same creature.

When there is the matched texture features in the feature library, the texture recognition apparatus may determine that the matched texture features and the extracted side texture feature are features of the same creature. Optionally, the texture recognition apparatus may also determine that the creature corresponding to the extracted side texture features is: the creature corresponding to the matched texture features in the feature library.

In step 209, texture recognition fails.

Optionally, the texture recognition method according to the embodiment of the present disclosure may be applied to a terminal. For example, before the terminal is unlocked, the texture recognition method according to the embodiment of the present disclosure may be used to determine whether to perform the unlocking.

Exemplarily, the texture recognition apparatus is arranged in the terminal, and the feature library of the texture recognition apparatus may store side texture features of selected joints of a user of the terminal. When the screen of the terminal is lit on, the texture recognition apparatus needs to acquire a side texture image of a selected joint of the user of the terminal, and perform the recognition processes in step 204 to step 207 for the acquired side texture features. If it is determined, after the recognition operations, that the side texture features in the acquired side texture image and the matched texture features thereof in the feature library are both the features of the user of the terminal, the terminal may perform the unlocking step. If texture recognition fails, the terminal does not need to perform the unlocking step.

Optionally, a plurality of applications may be mounted on the terminal. Before an application is run on the terminal, it may also be determined whether to run the application by using the texture recognition apparatus. The determination process may refer to the process of determining whether to perform the unlocking, and is not described in the embodiments of the present disclosure any further.

Optionally, the texture recognition method according to the embodiment of the present disclosure may also be applied to an attendance machine, wherein the texture recognition apparatus is arranged on the attendance machine, and the feature library of the texture recognition apparatus may store the side texture features of the selected joints of a plurality of users of the attendance machine. The texture recognition apparatus needs to acquire a side texture image of a selected joint of a user of the attendance machine, and perform the recognition processes in step 204 to step 207 for the acquired side texture features. If it is determined, after the recognition operations, that the side texture features in the acquired side texture image and the matched texture features thereof in the feature library are both the features of the user of the same attendance machine, the attendance machine determines that the user of the attendance machine successfully records attendance thereof. If texture recognition fails, the attendance machine determines that the user of the attendance machine fails in attendance recording.

Optionally, the texture recognition method according to the embodiment of the present disclosure may also be applied to other apparatus (for example, a fingerprint lock), which is not described in the embodiment of the present disclosure any further.

It should be noted that the sequence of the steps in the texture recognition method according to the embodiment of the present disclosure may be adaptively adjusted. For example, step 201 and step 202 may be performed prior to any one of step 203 to step 206, or step 204 may not be performed. A person skilled in the art would readily envisage method variations without departing from the technical scope disclosed in the present disclosure, and these method variations shall all fall within the protection scope of the present disclosure, which are thus not described herein any further.

In summary, in the texture recognition method according to this embodiment of the present disclosure, the side texture image of the selected joint of the creature is acquired, and side texture feature extraction and texture recognition are carried out based on the side texture image. Since the side texture of the joint has a strong concave and convex effect, and the texture is deep and achieves a strong three-dimensional effect, the accuracy of the extracted side texture features is higher, and the accuracy of texture recognition based on the side texture features is also higher.

In addition, as the texture features extracted in the embodiments of the present disclosure are the side texture features of the selected joints, and the side texture features of the selected joints of the creature are usually not directly exposed, it is difficult to steal the side textures and thus the safety of the side textures is high.

Figure 8:
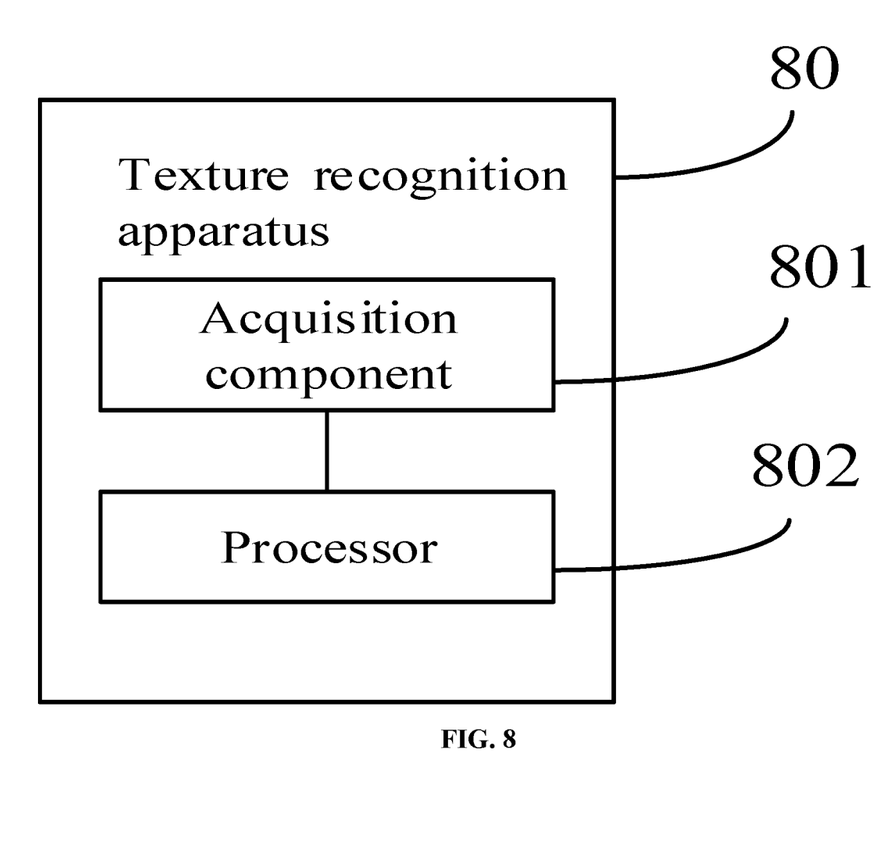
FIG. 8 is a schematic diagram of a structure of a texture recognition apparatus according to an embodiment of the present disclosure.

FIG. 8 is a schematic diagram of a structure of a texture recognition apparatus according to an embodiment of the present disclosure. As shown in FIG. 7, the texture recognition apparatus 80 may include: an acquisition component 801 and a processor 802.

The acquisition component 801 is configured to acquire a side texture image of a selected joint of an creature to be recognized;

The processor 802 is configured to extract side texture features in the side texture image; and The processor 802 is further configured to recognize a side texture of the selected joint based on the extracted side texture features.

In summary, in the texture recognition apparatus according to this embodiment of the present disclosure, the acquisition component acquires the side texture image of the selected joint of the creature, and the processor carries out the side texture feature extraction and texture recognition based on the side texture image. Since the side texture of the joint has a strong concave and convex effect, and the texture is deep and achieves a strong three-dimensional effect, the accuracy of the extracted side texture features is higher, and the accuracy of texture recognition based on the side texture features is also higher.

Optionally, the processor 802 is further configured to pre-process the side texture image.

Optionally, the creature is a person, and the selected joint comprises a finger joint.

Optionally, the processor 802 is further configured to:

compare the extracted side texture features with side texture features in a feature library, wherein the feature library stores side texture features of selected joints of at least one creature; and when there is a matched texture feature in the feature library, it is determined that the extracted side texture feature and the matched texture feature are features of the same creature, and the matching degree of the matched texture feature and the extracted side texture feature is greater than a matching degree threshold.

Figure 9:
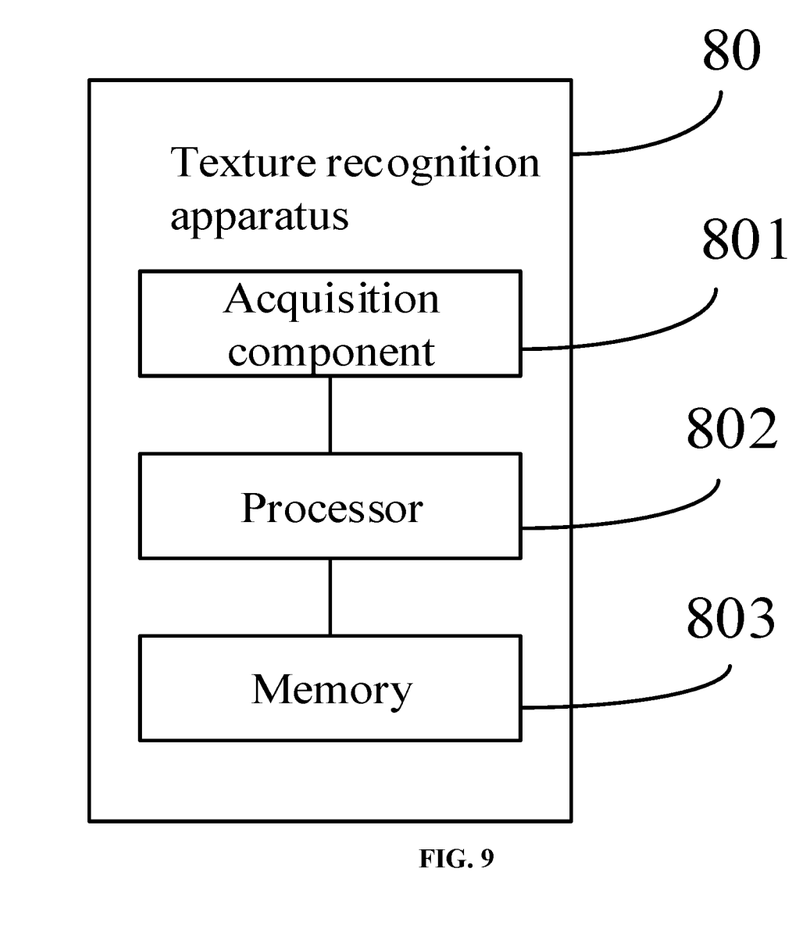
FIG. 9 is a schematic diagram of a structure of a texture recognition apparatus according to an embodiment of the present disclosure.

Optionally, FIG. 9 is a schematic diagram of a structure of another texture recognition apparatus according to an embodiment of the present disclosure. As shown in FIG. 9, on the base of FIG. 8, the texture recognition apparatus may further include: a memory 803.

The acquisition component 801 is further configured to, for each creature of the at least one creature, acquire the side texture features of the selected joint of the creature; and the memory 803 is configured to store the side texture features of the selected joint of the at least one creature acquired by the acquisition component to the feature library.

Optionally, the acquisition component 801 is further configured to: select a current security level from a plurality of security levels, the plurality of security levels corresponding to a plurality of acquisition counts, and the security levels being positively correlated with a value of the acquisition count; and for the creature to be recognized, acquire p side texture images, the p side texture images comprising at least one side texture image of the selected joint, and p being the acquisition count corresponding to the current security level, p≥1.

Optionally, the side texture features in the side texture image are fewer than texture features in a fingerprint image.

Optionally, pre-processing include at least one of: normalization processing, filtering enhancement processing, binarization processing, and refinement processing.

Optionally, the feature library stores a plurality of side texture features of the selected joints; and the processor is configured to: compare the extracted side texture features with the plurality of side texture features; or compare the extracted side texture features with at least one group of texture feature, wherein the at least one group of texture features are obtained by division of the plurality of side texture features, and each group of texture features comprise at least two side texture features, and the comparison between the acquired texture features and the side texture features in each group of texture features is carried out simultaneously.

Optionally, the processor is configured to: determine a ridge termination point in the side texture image based on grayscale values of various pixels in the pre-processed side texture image; determine a ridge bifurcation point in the side texture image based on the grayscale values of the various pixels in the pre-processed side texture image; and determine a plurality of ridges in the side texture image based on the determined ridge termination point and the determined ridge bifurcation point, and extract the plurality of ridges as the side texture features.

In summary, in the texture recognition apparatus provided by this embodiment of the present disclosure, the acquisition component acquires the side texture image of the selected joint of the creature, and the processor carries out the side texture feature extraction and texture recognition based on the side texture image. Since the side texture of the joint has a strong concave and convex effect, and the texture is deep and achieves a strong three-dimensional effect, the accuracy of the extracted side texture features is higher, and the accuracy of texture recognition based on the side texture features is also higher.

In the embodiments of the present disclosure, the terminal may be, for example, a mobile terminal, such as a mobile phone, a personal digital assistant (PDA), a tablet computer, a laptop computer or the like.

In the embodiments of the present disclosure, the acquisition component may be, for example, a camera or a scanner based on CCD or CMOS.

In the embodiments of the present disclosure, the processor may include one or more central processing units (CPUs), field programmable gate arrays (FGPAs), micro-controller units (MCUs), digital signal processors (DSPs), application specific integrated circuits (ASICs) and the like logic operation devices having the data processing capability and/or program execution capability.

In the embodiments of the present disclosure, the memory may be a volatile memory and/or a non-volatile memory. The volatile memory may include, for example, a random access memory (RAM) and/or a high-speed cache or the like. The non-volatile memory may include, for example, a read-only memory (ROM), a hard disk, a flash memory or the like.

In the embodiments of the present disclosure, coupling between the processor, the acquisition component and the like elements may be implemented in a plurality of connection manners. For example, these elements may be coupled via networks, for example, via a wireless network, a wired network, and/or any combination of a wireless network and a wired network. The networks may include a local area network, the Internet, a telecommunication network, the Internet of Things based on the Internet and/or the telecommunication network, and/or any combination of the these networks and the like. The wired network may, for example, employ twisted pairs, co-axial cables, optical fiber transmissions, and cables and the like for communication; and the wireless network may, for example, employ 3G/4G/5G mobile communication networks, Bluetooth, Zigbee or Wi-Fi or the like for communication.

An embodiment of the present disclosure provides a computer-readable storage medium having stored therein instruction. The readable storage medium, when operating in a processor, causes the processor to perform the above-mentioned texture recognition method.

In the embodiments of the present disclosure, the computer-readable storage medium may be as shown in the above memory.

An embodiment of the present disclosure provides a computer program product comprising instructions. The computer program product, when executed on a computer, causes the computer to perform the above-mentioned texture recognition method.

It should be noted that the method embodiments and the corresponding apparatus embodiments of the present disclosure may be cross referenced, which is not limited in the embodiments of the present disclosure. The sequence of the steps in the method embodiments may be adjusted appropriately, and the steps may be deleted or added according to the situation. Within the technical scope disclosed in the present disclosure, any variations of the method easily derived by a person of ordinary skill in the art shall fall within the protection scope of the present disclosure, which is not repeated here.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An identification method, comprising:
    acquiring a side texture image of a selected joint of a creature to be recognized by capturing an image on a side of the selected joint of the creature to be recognized, wherein the side is in a direction of a rotation axis of the selected joint and the side texture image comprises a strip-like ridge corresponding to the side of the selected joint;
    extracting side texture features in the side texture image;
    dividing a plurality of side texture features in a feature library into at least two group of texture features, each group of texture features comprising at least two side texture features, wherein the feature library stores side texture features of the selected joint of at least one creature; and
    recognizing a side texture of the selected joint based on the extracted side texture features to verify an identity of the creature to be recognized;
    wherein the recognizing a side texture of the selected joint based on the extracted side texture features comprises:
    comparing the extracted side texture features with side texture features in the feature library, wherein comparison between extracted side texture features and side texture features in each group of texture features is carried out simultaneously; and
    determining that the extracted side texture features and the matched texture features are features of the same creature in response to presence of matched texture features in the feature library.

2. The method according to claim 1, wherein prior to the extracting side texture features in the side texture image, the method further comprises:
    pre-processing the side texture image.

3. The method according to claim 1, wherein the creature is a person, and the selected joint comprises a finger joint, and the side texture image further comprises a side semi-annular ridge of the selected joint.

4. The method according to claim 1, wherein prior to the recognizing a side texture of the selected joint based on the extracted side texture features, the method further comprises:
    acquiring the side texture features of the selected joint of each of at least one creature by capturing an image on the side of the selected joint of each of the at least one creature; and
    storing the acquired side texture features of the selected joint of the at least one creature to the feature library.

5. The method according to claim 1, wherein the acquiring a side texture image of a selected joint of a creature to be recognized comprises:
    selecting a current security level from a plurality of security levels, the plurality of security levels corresponding to a plurality of acquisition counts, and the security levels being positively correlated with a value of the acquisition counts; and
    acquiring p side texture images for the creature to be recognized, the p side texture images comprising at least one side texture image of the selected joint, and p being the acquisition count corresponding to the current security level, $p \geq 1$.

6. The method according to claim 1, wherein the side texture features in the side texture image are fewer than texture features in a fingerprint image.

7. A non-transitory computer-readable storage medium having stored therein instructions, wherein the readable storage medium, when operating in a processor, causes the processor to perform one or more steps in the identification method according to claim 1.

8. The method according to claim 2, wherein the pre-processing comprises at least one of normalization processing, filter enhancement processing, binarization processing, and refinement processing.

9. The method according to claim 2, wherein the extracting side texture features in the side texture image comprises:
    determining a ridge termination point in the side texture image based on grayscale values of various pixels in the pre-processed side texture image;
    determining a ridge bifurcation point in the side texture image based on the grayscale values of the various pixels in the pre-processed side texture image; and
    determining a plurality of ridges in the side texture image based on the determined ridge termination point and the determined ridge bifurcation point, and extracting the plurality of ridges as the side texture features.

10. A non-transitory computer-readable storage medium having stored therein instructions, wherein the readable storage medium, when operating in a processor, causes the processor to perform one or more steps in the identification method according to claim 2.

11. A non-transitory computer-readable storage medium having stored therein instructions, wherein the readable storage medium, when operating in a processor, causes the processor to perform one or more steps in the identification method according to claim 3.

12. A non-transitory computer-readable storage medium having stored therein instructions, wherein the readable storage medium, when operating in a processor, causes the processor to perform one or more steps in the identification method according to claim 4.

13. A non-transitory computer-readable storage medium having stored therein instructions, wherein the readable storage medium, when operating in a processor, causes the processor to perform one or more steps in the identification method according to claim 5.

14. A texture recognition apparatus, comprising: an acquisition component and a processor,
    wherein the acquisition component is configured to acquire a side texture image of a selected joint of a creature to be recognized by capturing an image on a side of the selected joint of the creature to be recognized, wherein the side is in a direction of a rotation axis of the selected joint and the side texture image comprises a strip-like ridge corresponding to the side of the selected joint;

the processor is configured to extract side texture features in the side texture image;

the processor is configured to divide a plurality of side texture features in a feature library into at least two group of texture features, each group of texture features comprising at least two side texture features, wherein the feature library stores side texture features of the selected joint of at least one creature; and the processor is further configured to recognize a side texture of the selected joint based on the extracted side texture features to verify an identity of the creature to be recognized, and the processor is further configured to:

compare the extracted side texture features with side texture features in the feature library, wherein comparison between extracted side texture features and side texture features in each group of texture features is carried out simultaneously; and determine that the extracted side texture features and the matched texture features are features of the same creature in response to presence of matched texture features in the feature library.

15. The texture recognition apparatus according to claim 14, wherein the processor is further configured to pre-process the side texture image.

16. The texture recognition apparatus according to claim 14, wherein the creature is a person, and the selected joint comprises a finger joint.

17. The texture recognition apparatus according to claim 1'1 claim 14, further comprising: a memory, wherein the acquisition component is further configured to, acquire the side texture features of the selected joint of each of at least one creature by capturing an image on the side of the selected joint of each of the at least one creature; and the memory is configured to store the side texture features of the selected joint of the at least one creature acquired by the acquisition component to the feature library.

18. The texture recognition apparatus according to claim 14, wherein the acquisition component is further configured to:

select a current security level from a plurality of security levels, the plurality of security levels corresponding to a plurality of acquisition counts, and the security levels being positively correlated with a value of the acquisition counts; and acquire p side texture images for the creature to be recognized, the p side texture images comprising at least one side texture image of the selected joint, and p being the acquisition count corresponding to the current security level, $p \geq 1$.

19. The texture recognition apparatus according to claim 14, wherein the side texture features in the side texture image are fewer than texture features in a fingerprint image.

20. The texture recognition apparatus according to claim 15, wherein the processor is configured to perform at least one of the following pre-processing operations: normalization processing, filter enhancement processing, binarization processing, and refinement processing.

* * * * *